United States Patent [19]

Beshai et al.

[11] Patent Number: 5,745,486
[45] Date of Patent: Apr. 28, 1998

[54] HIGH CAPACITY ATM SWITCH

[75] Inventors: Maged E. Beshai, Stittsville; Ernst A. Munter, Kanata, both of Canada

[73] Assignee: Northern Telecom Limited, Montreal, Japan

[21] Appl. No.: 548,716

[22] Filed: Oct. 26, 1995

[51] Int. Cl.$^6$ .................................... H04Q 11/04
[52] U.S. Cl. .................... 370/352; 370/380; 370/395
[58] Field of Search .................... 370/352, 395, 370/398, 380, 370; 359/109, 127, 128

[56] References Cited

U.S. PATENT DOCUMENTS

| | | | |
|---|---|---|---|
| 5,168,492 | 12/1992 | Beshai et al. | 370/60.1 |
| 5,303,232 | 4/1994 | Proctor et al. | 370/398 |
| 5,544,168 | 8/1996 | Jeffrey et al. | 370/395 |
| 5,550,818 | 8/1996 | Brackett et al. | 370/395 |
| 5,604,617 | 2/1997 | Burton | 370/380 |

OTHER PUBLICATIONS

"Expandable ATOM Switch Architecture (XATOM) for ATM LANs", R. Fan et al., Serving Humanity Through Communications Supercomm/ICC,IEE, vol. 1, No. 1, May 1994, pp. 402–409.

"Applications of PRAMs in Telecommunications", R. Drefenstedt et al., Technology and Foundations, Information Processing '94, B. Pehrson and I. Simon –Editors, vol. 1, Aug. 1994, pp. 203–210.

*Primary Examiner*—Douglas W. Olms
*Assistant Examiner*—Shick Hom
*Attorney, Agent, or Firm*—Yoshiharu Toyooka

[57] ABSTRACT

An ATM switch architecture expandable to multi-terabits/s uses data transfer in a heterogeneous burst of a constant length. It employs rotators connecting stages in a three-stage switch configuration. In one embodiment, the cells are sorted at ingress and a matching process is performed between the first and middle stages. The switch is simple to control and has high performance at both the call and cell levels. It also meets the basic requirements that cells be delivered in the proper order, and that the rate of any individual connection be as high as the inlet-port rate. With a small internal expansion, the switch is non-blocking in the sense that any bit-rate acceptable to both the inlet and outlet ports will be guaranteed a path through the core. This feature is particularly useful in services which may require frequent bit-rate change during the connection time.

15 Claims, 10 Drawing Sheets

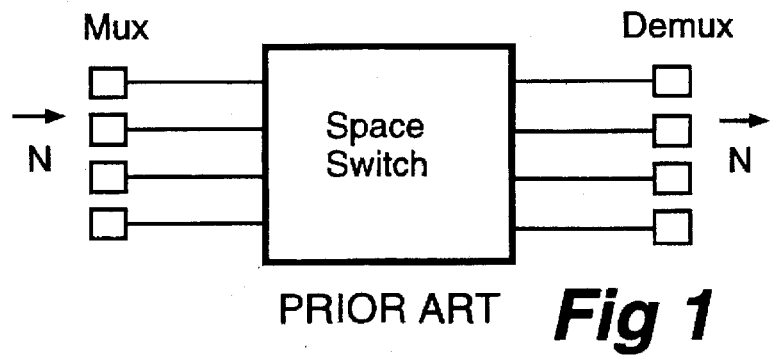
PRIOR ART *Fig 1*
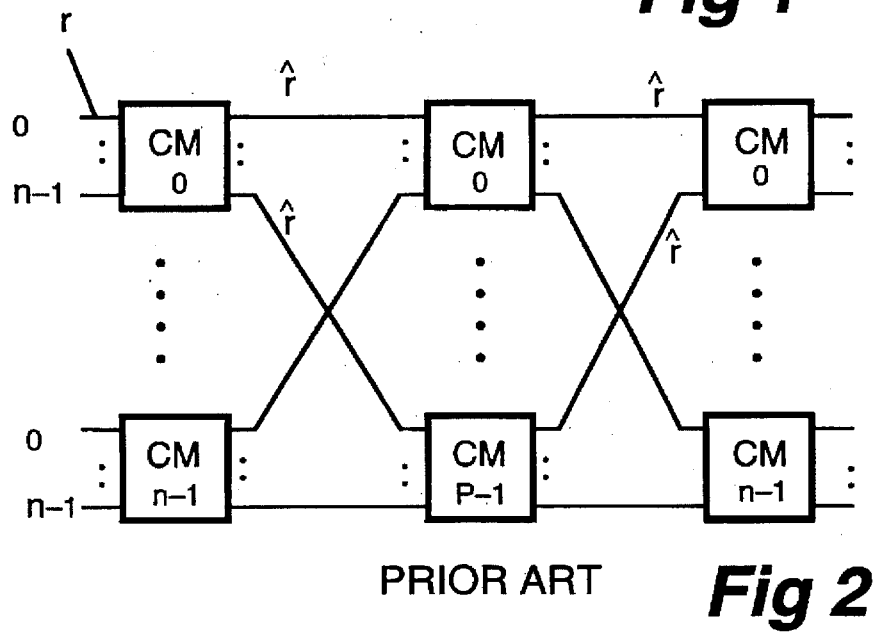
PRIOR ART *Fig 2*
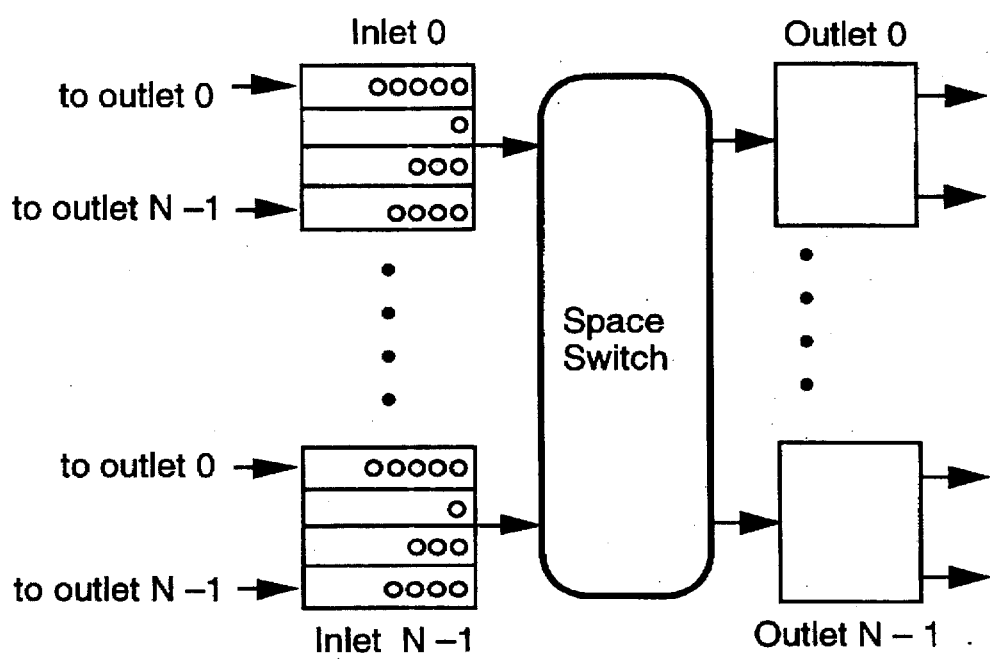
PRIOR ART *Fig 3*

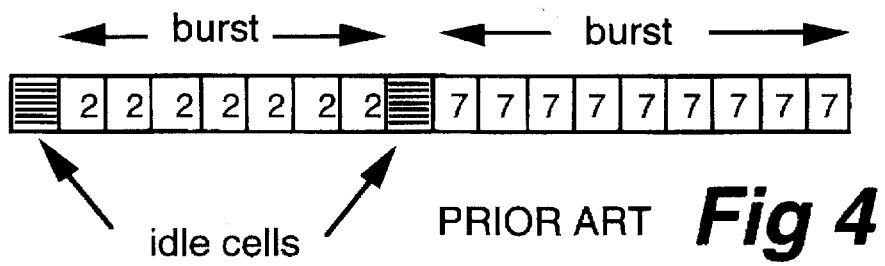
PRIOR ART Fig 4
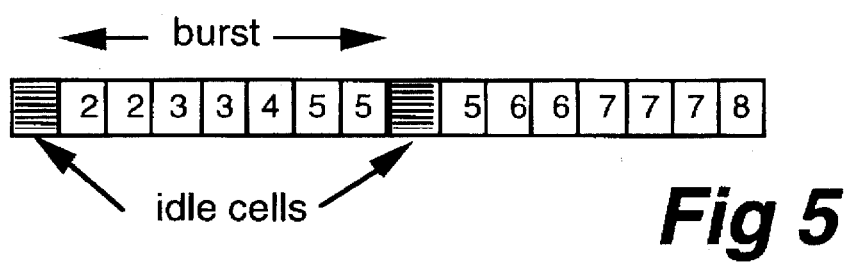
Fig 5
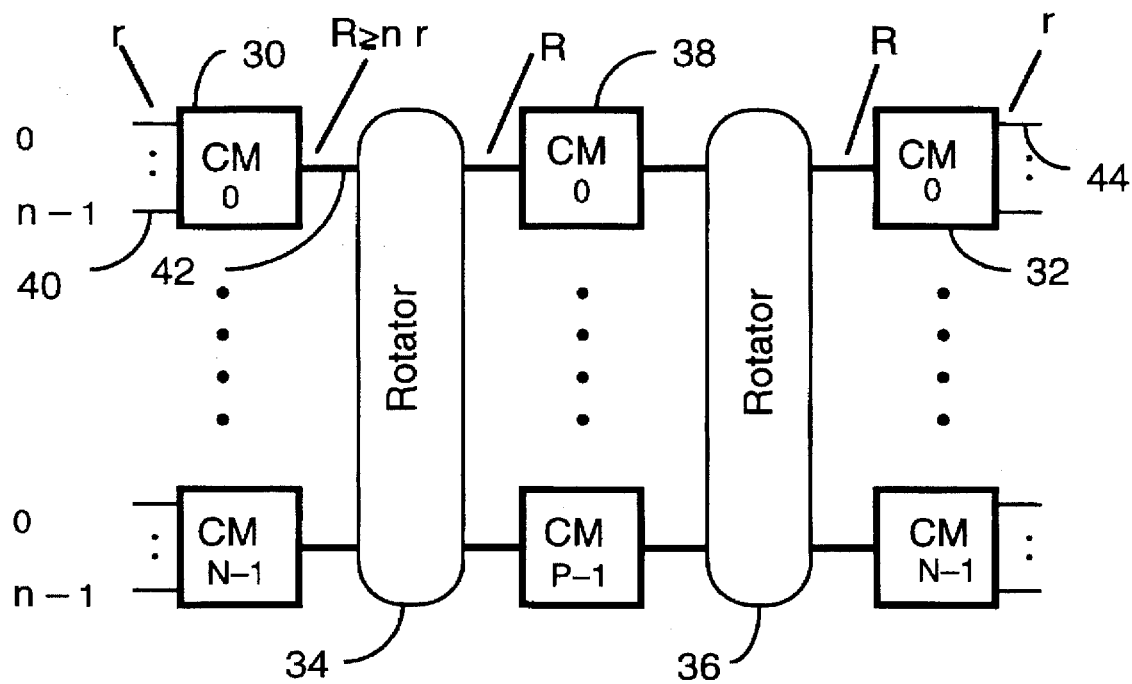
Fig 6

Δ : access time

HIGH CAPACITY ATM SWITCH

FIELD OF THE INVENTION

The invention generally relates to ATM switches. In particular, it is directed to high capacity ATM switches which use rotators and common memory modules.

BACKGROUND OF THE INVENTION

Traditional ATM switches are primarily cell-synchronous. The two most popular configurations used in large-scale switching nodes are the buffer-space-buffer and the three-buffer-stage networks. FIG. 1 shows a typical buffer-space-buffer network. An N×N single-stage space switch interconnects N asynchronous multiplexers to N asynchronous demultiplexers. Priority queuing may be provided at the inlet modules in order to control the quality-of-service (QOS) of traffic streams belonging to different classes. The inlet multiplexers and outlet demultiplexers may be paired to form a folded architecture with intra-module switching. With asynchronous multiplexing at inlet, this configuration requires a fast mechanism for contention resolution. In the classical buffer-space-buffer architecture, arbitration to resolve multiple simultaneous demand for a given outlet is done on a cell-by-cell basis, requiring a fast mechanism.

FIG. 2 depicts a known plain three-buffer-stage configuration. This configuration does not have a contention problem, thanks to the extra buffering stage, but has some capacity limitations. In the architecture of FIG. 2, each component is an n×n common-memory (CM) or output-buffered (OB) switch; n is typically 16 or so and there are P middle modules. With P=n, the total capacity is limited to $n^2$ times the link speed r. In the folded architecture which will be described below, the capacity limit is (½) $n^2$ times the link speed r. The cells of a given connection, between different outer modules, must be routed through the same intermediate switching module in order to guarantee proper cell order. Priority service can be implemented at one or more stages.

As mentioned above, the cell-synchronous switches have capacity limitations. A co-pending patent application, Ser. 08/352,405 filed on Dec. 8, 1994 by Munter, describes a switch architecture suitable for very high-speed networks. The design was guided by two main principles. The first is to transfer multiple cells, padded by a reasonable guard time, to circumvent the high speed cell synchronization problem. The second is to sort the incoming cells at ingress to facilitate internal routing and congestion control within the switch. The multiple cells, hereafter called bursts, must belong to the same egress port, and the burst length could vary significantly from one cell to a hundred cells or so. The bursts are transferred directly from inlet to outlet through an optical space switch and a central controller is used to realize a collision-free transfer. As such, the switch capacity is limited mainly by the speed of the controller.

Specifically speaking, the classical buffer-space-buffer architecture has a single input buffer (perhaps per class), and the destination information is only stored in the cell headers. As shown in FIG. 3, in the architecture of the above co-pending application the cells are sorted according to destination, thus facilitating the contention resolution task. In FIG. 3, the common buffer of each inlet module (inlet to space switch) is divided into a number of variable length sections. The number of sections is N or less, depending on the number of inlet modules. Priority service can be implemented by a further subdivision of each section according to the number of classes per destination. The inter-module payload transfer is based on requests and grants. An inlet module which has cells to send to an outlet module must signal its intention to do so. The control system decides the time of the load transfer and the number of cells in each transaction. The load is transferred in the form of homogeneous bursts; a homogeneous burst contains cells of the same destination as depicted in FIG. 4. The idle slots shown in FIG. 4 represent the inter-burst guard time. This gives rise to two possibilities: a centralized-control protocol, or a protocol based on distributed control. The architecture in the copending application is based on central control. An inlet module makes a request by simply indicating the required destination and the number of cells in the current load. This information is sent through a control bus accessed periodically (or by any other suitable discipline) by the central controller. Cell order is naturally preserved since requests are processed one at a time. The highest individual connection rate equals the inlet-port rate, for example 600 Mb/s or so. The capacity of the switch is limited primarily by the controller speed. Even with a dedicated processor per inlet controlling the traffic flow, excessive delays would occur when the number of destinations is large. With a relatively small number of inlet (outlet) modules, N=16 for example, the cell delay performance is excellent. Also, the inlet-buffer requirement is quite modest at relatively high traffic loads. Thus, an infinitesimal cell-loss is realizable with a reasonable buffer size.

In U.S. Pat. No. 5,168,492 (Beshai et al), issued Dec. 1, 1992, rotating access ATM/STM packet switches are described which are functionally equivalent to the classical buffer-space-buffer architecture. In the basic embodiment, it uses middle packet buffers with a rotator (commutator) at its input and output.

The use of burst transfer, optical rotators, and distributed control facilitates the construction of high capacity switches using lower capacity modules. According to the present invention, a significant capacity increase can be realized if rotators are used and several controllers operate simultaneously on non-overlapping inlet-outlet pairs. This can be achieved in a simple manner if the condition that a burst must contain cells of the same destination is relaxed, and if the bursts are of equal size. In the architecture of FIG. 3, the bursts are homogeneous (i.e., all the burst cells have the same destination) and of variable length, as shown in FIG. 4. The control can be enhanced if the bursts are heterogeneous and of equal size as shown in FIG. 5. A heterogeneous burst may contain cells of different destinations. The invention therefore uses the concepts described in the above-referenced copending patent application and the rotating-access idea of U.S. Pat. No. 5,168,492 to construct a switch with an ultimate capacity of several tera bits/s. The maximum connection rate, which is the permissible rate for a single user, is the inlet port speed.

OBJECTS OF THE INVENTION

It is an object of the invention to provide a high capacity ATM switch which employs rotators in a three-stage configuration and transfers data in heterogeneous bursts of a predetermined length.

It is another object of the invention to provide a method of switching data in heterogeneous bursts of a predetermined length.

It is a further object of the invention to provide a high capacity ATM switch which uses matching of cells between inlet buffers and middle buffers.

It is yet another object of the invention to provide a method of switching data in heterogeneous bursts of a predetermined length which includes a step of matching cells between the inlet and middle stages.

It is still another object of the invention to provide a high capacity ATM switch which is internally non-blocking.

SUMMARY OF THE INVENTION

Briefly stated, according to one aspect, the invention relates to a high capacity ATM switching system for switching data in a heterogeneous burst of a predetermined number of cells among N inlet modules and M outlet modules in each successive access time, M and N being a positive integer or integers. The switching system comprises the N inlet modules having buffers, each buffer dedicated to each of the outlet modules, for storing cells according to the destination outlet modules of the cells in respective buffers and P common memories, P being a positive integer, each common memory having M memory sections, each of which is able to hold at least said predetermined number of cells and is dedicated to each outlet module. The switching system further includes an inlet rotator for cyclically connecting in each access time the N inlet modules and P common memories so that respective cells are transferred from the N inlet modules and stored in respective sections according to the destination outlet module of each cell, and an outlet rotator for cyclically connecting in each access time the P common memories and M outlet modules so that respective outlet modules are connected to respective memory sections for reading out cells contained therein.

According to another aspect, the invention is directed to a method of switching data in a heterogeneous burst of a predetermined number of cells among N inlet modules and M outlet modules in each successive access time, M and N being a positive integer or integers. The method comprises steps of each of the N inlet modules storing cells in separate buffers according to the destination outlet modules of the cells and cyclically connecting the N inlet modules and P common memories, P being a positive integer. The method further includes steps of transferring in each access time the burst of the predetermined number of cells from one of the N inlet modules to respective memory sections of one of the common memories according to the destination outlet modules of the cells, and cyclically connecting the common memories and M outlet modules so that respective outlet modules are connected to the respective memory section for reading out cells contained therein.

BRIEF DESCRIPTION OF THE DRAWINGS

FIG. 1 is a known buffer-space-buffer switch;

FIG. 2 is a known three-stage switch;

FIG. 3 shows a buffer-space switch with inlet sorting and burst transfer;

FIG. 4 shows variable-length homogeneous bursts;

FIG. 5 shows constant-length heterogeneous bursts;

FIG. 6 is a three-stage rotator-linked switch according to one embodiment of the invention;

DETAILED DESCRIPTION OF THE PREFERRED EMBODIMENTS OF THE INVENTION

Figure 7:
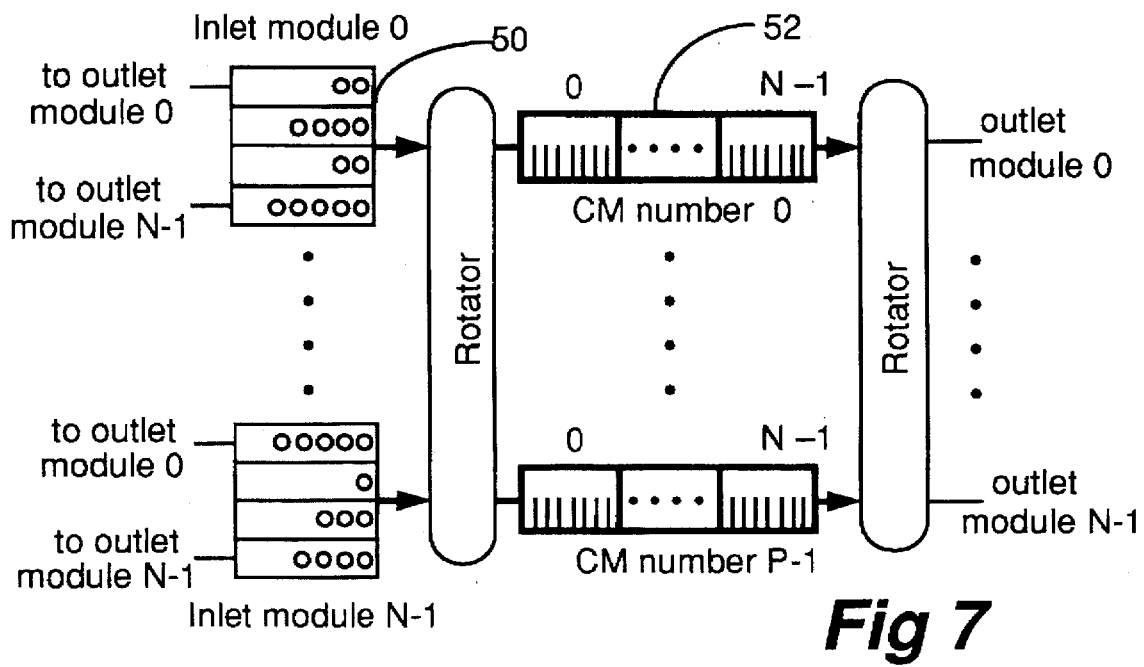
FIG. 7 is a three-stage switch with inlet sorting, burst transfer, and distributed control according to another embodiment of the invention.

FIG. 6 shows schematically a switching architecture according to one embodiment of the invention. In this embodiment, N inlet modules 30 and N outlet modules 32 are linked by two optical rotators 34, 36 and P middle modules 38. Each inlet module receives data from n inputs 40 and sends multiplexed data to rotator 34 through a serial link 42. Each outlet module accepts multiplexed data from rotator 36 and demultiplexes them to n outputs 44. N, P and n are any positive integer numbers. It is also possible to have different numbers of inlet and outlet modules. In this embodiment, the inlet, middle and outlet modules are made of several common memory modules and designated $CM_0$–$CM_{N-1}$ and $CM_0$–$CM_{P-1}$. Each rotator is a $k \times k$ rotator, $k > 1$ which is a periodic selector, equitably connecting each of its inputs to each of its outputs. In other words, it is a counter-driven $k \times k$ selector. It functions as $k$ parallel sets of $k$ serial links (a total of $k^2$ links). With identical inlets of speed, e.g., $\chi$b/s each, the speed of each link is $\chi/k$ b/s. These links are hereafter called "virtual links". They are called virtual because they are reconfigurable. A virtual link connects an outer CM to a middle CM during a fixed interval of several time slots (a time slot is the cell duration). This interval is called the "access time", denoted $\Delta$.

A burst of cells of possibly different destinations is transferred from an inlet CM to a middle CM per access time. The highest individual-connection rate is $r^*(n/P)$, where n is the number of external ports per CM, P is the number of middle CMs and r is the speed of an external port. This configuration works almost exactly like the three-stage switch shown in FIG. 2, the only difference being that the links from a given outer module to the set of middle modules are fast and intermittent in this architecture as compared to slower and continuous in the standard architecture of FIG. 2; hence the need for burst transfer.

This architecture does not require control communications between the stages. The capacity is virtually unlimited. The overall cell delay variance, however, may be unacceptable for CBR (constant bit rate) and other delay-sensitive traffic. This problem can be solved by appropriate path selection for the virtual circuits at the call-admission stage and by providing priority classification, at least at the middle CMs. Basically, the internal-routing mechanism should distribute the delay-sensitive traffic equitably among the middle CMs, where they are given high transfer priority to the output modules. There are different traffic classifications such as the CBR, the VBR (variable bit rate), and the ABR (available bit rate). An individual connection, regardless of classification, must use the same middle CM in order to maintain proper cell sequence. This requirement limits the highest connection rate per user to $r^*n/P$. For example, if $r=620$ Mb/s, $n=16$, and $P=256$, the capacity of the switch is approximately 2.5 Tb/s but the highest connection rate is less than 40 Mb/s (620×16/256). Thus, the price of high capacity is a reduced upper bound of individual connection rates.

The same high capacity, but with an individual connection rate as high as the external port speed, is realized with further controls as will be described below in connection with a further embodiment of the invention.

FIG. 7 shows such an embodiment which uses a matching process. During a rotator cycle, each inlet module 50 visits each middle CM 52. The access time, denoted Δ (slots), during each visit is fixed. At a rotator port speed of 10 Gb/s, for example, a value of Δ=16 corresponds to about 0.7 μsec. During each access time, a number of cells belonging to one or more outlet modules is transferred. A guard time of one or two cells may be needed within each access time. The productive time of the access time is hereafter called the duty cycle, and the number of cells per duty cycle is denoted D. A control array within each middle CM stores the number of cells destined to each of the N outlet modules. There are N inlet and outlet modules in this embodiment but unequal numbers are possible. During each access time, each outlet module reads the cells destined to it and resets the corresponding entry of the control array to zero. The maximum number of cells read per access time is D (14, for example, if Δ is chosen to be 16 cells and a guard time of two cells is used). The admission of cells to the middle CMs is based on a matching process. The capacity is dependent on the size of the rotator and is virtually unlimited. There is a constant delay from each inlet to each outlet. This delay varies from one access time (of the order of 1 μsec) to N access times, but is constant for the same inlet-outlet pair. For example, with 16 OC12 (optical carrier, about 620 Mb/s) ports per inlet CM module, a time slot (ATM cell duration) at the optical rotator port is about 40 nsec. Selecting an access time of 16 slots (about 0.7 μsec), the worst constant delay in a large switch with 256 middle CM modules (2.5 Tb/s capacity) is less than 200 μsec.

During each access time (of 16 slots duration for example), each inlet module transfers a burst of cells to a middle module. The number of transferred cells is limited by the duty cycle, which is defined as the connection period (in cell times) minus the guard time (one or two cells, for example). In a 16 slot access time with 2 slot guard time, the duty cycle is 14. The cells may belong to many outlet modules.

Figure 8:
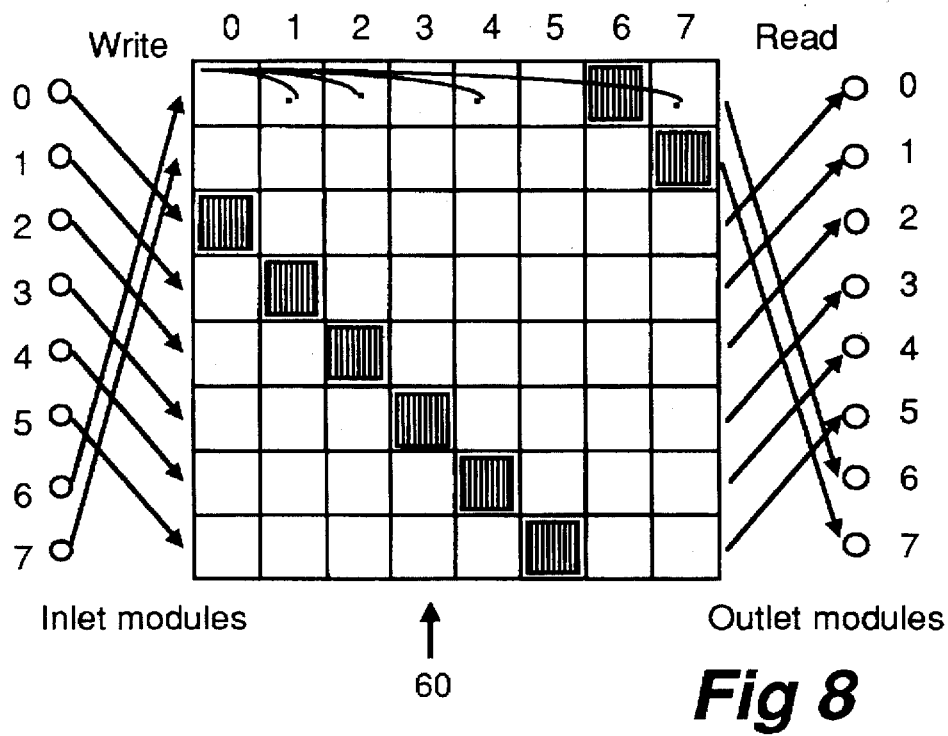
FIG. 8 shows the operation of rotating-access to middle CMs according to the invention.

FIG. 8 shows the operation of the middle CMs 60 in an 8×8 switch (N=8), each row representing a middle CM which is logically divided into 8 sections, each of which corresponds to an outlet module. A section is as wide (again only logically) as the duty cycle (14 cells, for example). During an access time, inlet module 6 in FIG. 8 is storing cells, in the top CM, destined to outlet modules 1, 2, 4, and 7. Each inlet module may write in different sections during the access time, after which the rotator moves to the next position. However, the accessing outlet module can only read whatever is found in its dedicated (logical) section. Thus outlet module 6 reads only cells stored in section 6 of each row as the rotator moves around.

Figure 9:
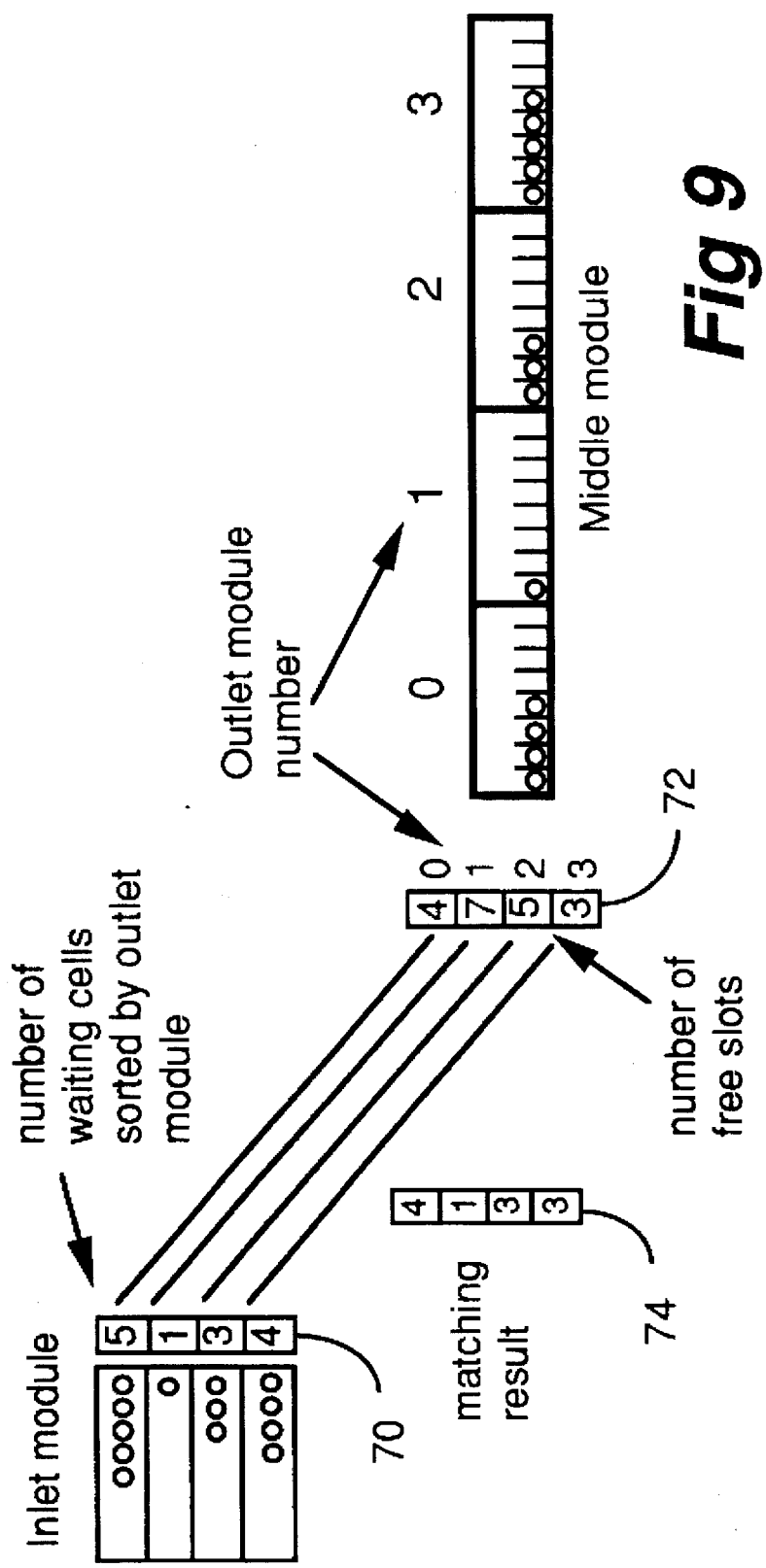
FIG. 9 illustrates the matching process of the invention.

The composition of the burst is determined through a simple matching process, as depicted in FIG. 9. Each inlet module keeps an array 70 of the number of waiting cells per destination and each middle module keeps an array 72 of the number of free slots per destination. The two arrays are matched in a cyclic order. As designated by 74, the number of cells accepted is the lesser of the number of waiting cells and the number of free slots for each destination inspected, the total being limited by the duty cycle.

Figure 10:
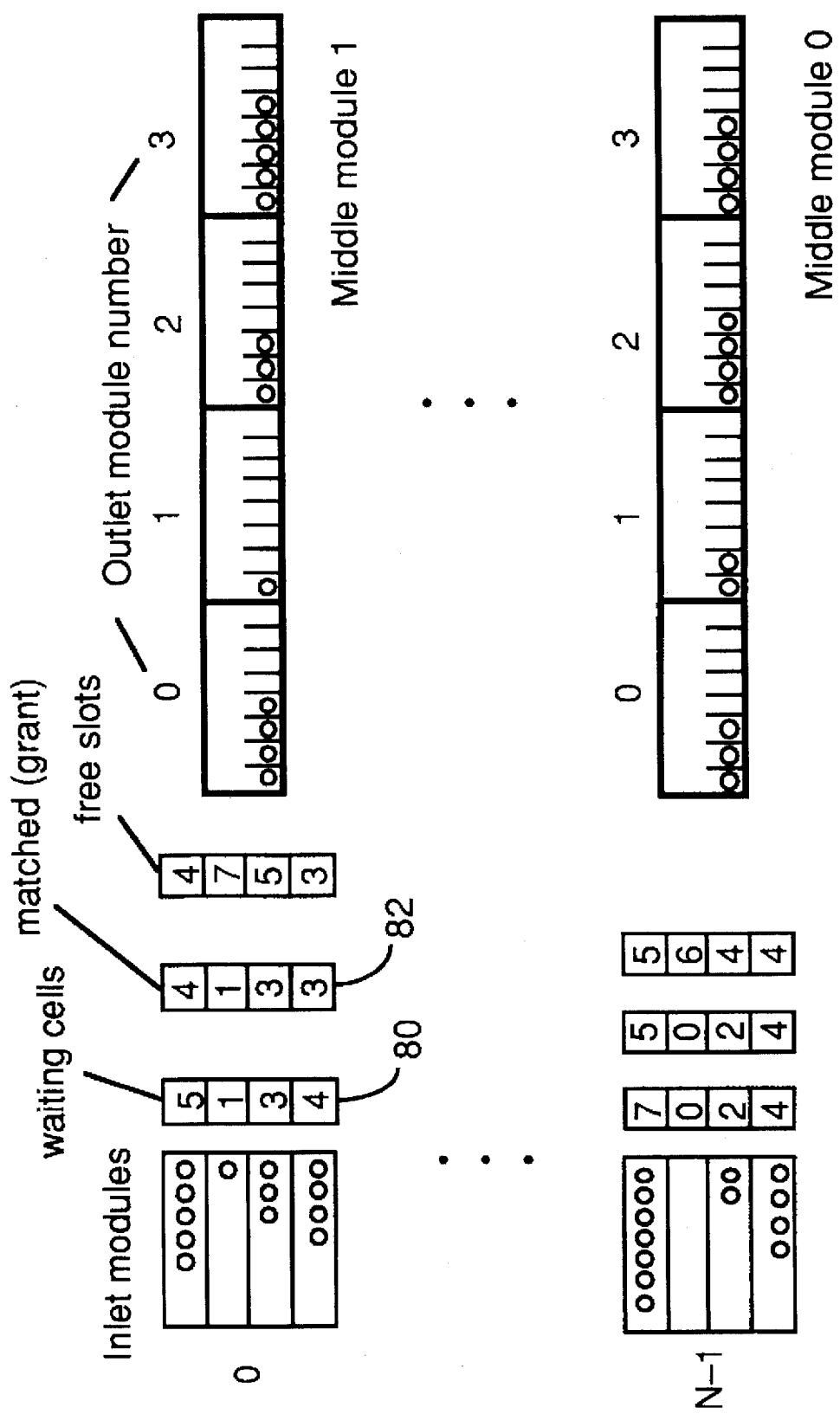
FIG. 10 shows the simultaneous matching process.

FIG. 10 shows the simultaneous transfer of bursts from N inlet modules to N middle modules (P=N). In the Figure, inlet modules 0, 1, ..., N−2, N−1 are accessing middle modules 1, 2, ..., N−1, 0. The logical order of rotation needs not follow the physical port order, i.e. the order can be preset in any way at the rotators. Cell order is preserved since the middle buffers are visited sequentially by both the inlet multiplexers and the outlet demultiplexers. The maximum number of cells to be stored in any middle CM is D times N, where D is the number of cells per duty cycle. The number of cells actually stored in the middle memory varies according to traffic load composition and the cell arrival pattern.

A direct method for performing the matching process of FIGS. 9 and 10 is to let each inlet module send to the middle module, which it will access during the subsequent access time, an array of N words of d-bit each, e.g., an array designated by 80, where $d=\lceil \log_2(D) \rceil$, D being the duty cycle and $\lceil . \rceil$ denotes rounding-up to the nearest integer. The maximum number of cells that can be transferred to any destination equals the number of cells in the duty cycle. Thus, with N=256 ports and D=14 (i.e., d=4), the number of bits transferred per access time is 1024 (approximately 2.4 cells). Each middle module then responds with a grant message 82 indicating the selected destinations, and the permissible number of cells for each. The maximum number of bits in the grant message is D (v+d) where $v \lceil \log_2(N) \rceil$. (There are at most D selected outlet modules per grant; vbits store the outlet module number and d bits store the number of cells per selected outlet module.) In the above example (N=256, D=14), the maximum message length is 168 bits. The ratio, θ, of the grant message overhead to the switch capacity is:

$$\theta = \frac{\lceil \log_2(N) \rceil + \lceil \log_2(D) \rceil}{B},$$

where B is the number of bits per ATM cell (B=424). With N=256 and D=14, θ is 0.028.

It is noted that the control-data transfer can be done in the reverse order; the middle modules may send their state information to the inlet module which performs the matching process.

This overhead (the volume of control data) can be reduced significantly by another embodiment described below. In this embodiment, the inlet modules send their inlet buffer states to middle modules every several access times and lets each middle module pass the inlet data, modified by the matching outcome, to the following unit. In other words, when middle module Y receives the state array from inlet module X, Y performs the matching process, reduces the inlet-state array according to the outcome of the matching process, and passes the reduced array to the next middle module Y+1 (modulo N), which will be accessed by the same inlet module X during the subsequent access time. The matching process must be implemented within the access time Δ. It is also noted that the ratio {(Δ/D)−1} is the expansion needed to realize an internally non-blocking switch (e.g., 16/14).

Figure 11:
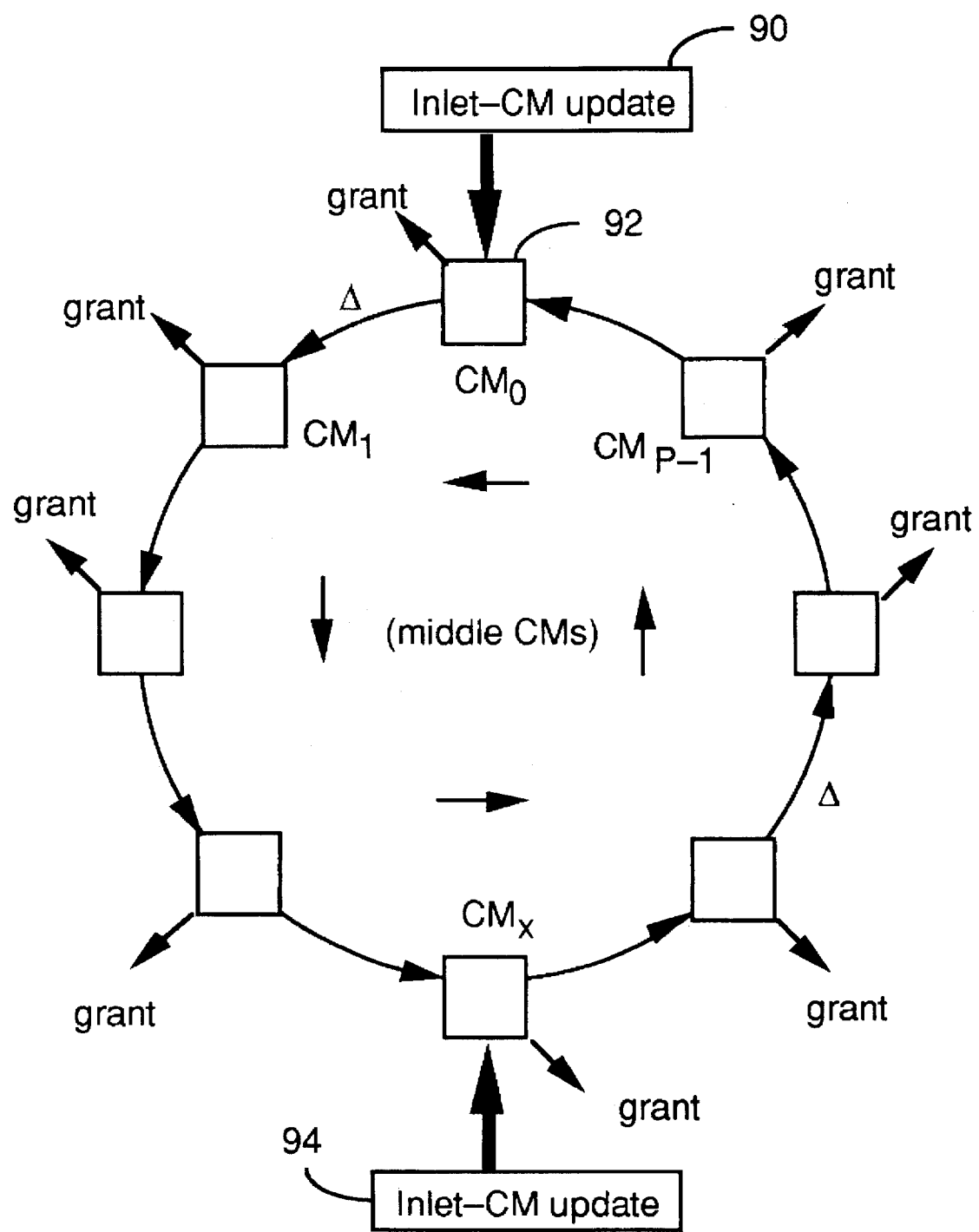
FIG. 11 shows yet a further embodiment of the invention which uses a ring configuration.

FIG. 11 illustrates such a mechanism, using a ring configuration. An inlet module 90 sends its buffer state information to middle module 92, e.g., $CM_0$, to which it will access for data transfer at the next access time. After having performed a matching process, $CM_0$ updates the buffer state of the inlet module 90 and sends the information to the following module e.g., $CM_1$, which performs the matching process with the updated buffer state of the inlet module 90 when the inlet module 90 accesses middle module $CM_1$ for data transfer. The further updated buffer state information is sent to the next middle module and so on for e.g., four access times (as shown in the example of FIG. 11), at which time inlet module 94 sends its buffer state information to middle module e.g., $CM_x$.

This mechanism is tolerant to long propagation delays from inlet to middle modules, otherwise propagation delays exceeding the access time may complicate the control function due to the interdependence of successive matching processes.

Sending the inlet state data every L access times, L>1, would reduce the corresponding control data volume by a factor $\eta$:

$$\eta = \frac{\lceil \log_2(L \cdot D) \rceil}{L \lceil \log_2(D) \rceil}.$$

The performance of the switch is quite insensitive to this artificial delay, and one may choose to send the inlet update every 16 or 32 access times. With L=32 and D=14, the factor $\eta$ is 0.0703. Note that $\eta=1$ when L=1. The ratio, $\epsilon$, of the control data overhead from the inlet modules to the middle modules to the switch capacity is:

$$\epsilon = \frac{N \lceil \log_2(L \cdot D) \rceil}{BLD},$$

where B is number of bits per ATM cell (B=424). With L=32, D=14, and N=256, $\epsilon$ is only 0.012.

The variable delay encountered in traversing the inlet and middle CMs is negligible for all traffic streams. Hence, priority classification is not necessary in either the inlet stage or the middle stage. It is noted, however, that priority service may be needed at egress, i.e., in the outlet stage. The egress performance is similar to that of a single-stage CM switch and is not discussed here.

The relevant performance indices here are the grade-of-service (GOS), determined mainly by the call-admission blocking and the quality-of-service (QOS), which is determined by the cell loss and/or cell transfer delay. The cell delay and cell loss contribution of the switching network of the present invention is at least an order of magnitude smaller than the contribution of the egress stage. Thus the overall performance is comparable to that of the (ideal) single stage switch, under similar traffic conditions.

Figure 16:
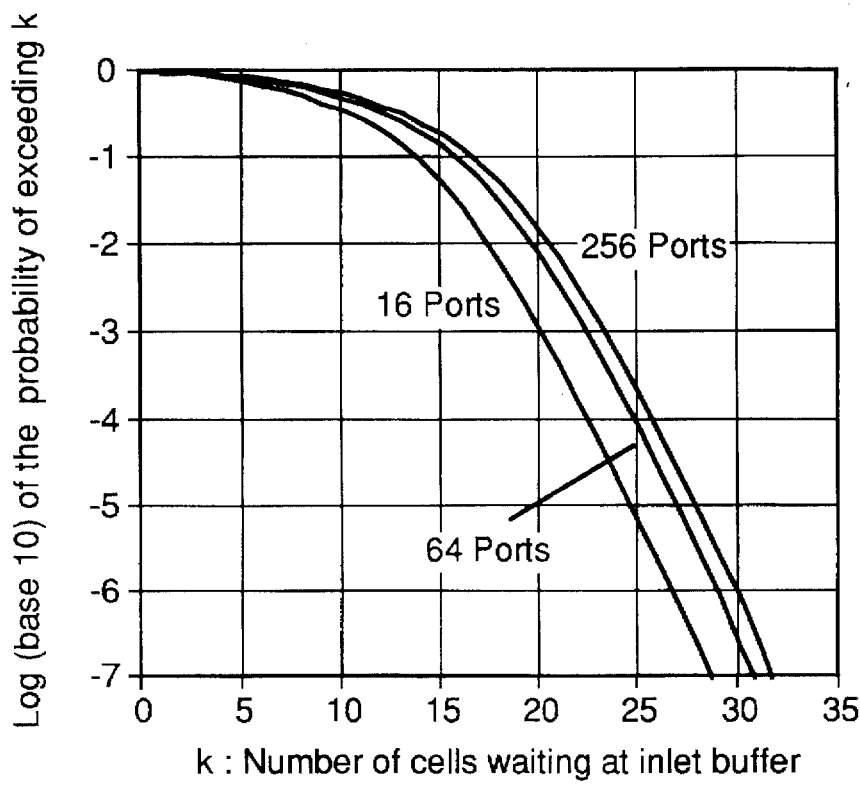
FIG. 16 is a graph showing inlet-buffer occupancy distribution.

The performance issues at the call and cell levels will be discussed below. Call-level blocking applies mainly to CBR and VBR traffic streams where the admission of a new arrival depends on its declared traffic descriptors and, hence, a calculated "effective bit rate (EBR)". The EBR value is determined by the cell-level performance (cell loss and/or cell delay variation). The multiplexing of the lower rate traffic at the inlet modules into a high speed stream, and the subsequent distribution among the middle CMs, have very little effect on the overall cell delay which is determined mainly by the outlet occupancy. The internal variable delay is negligible since each inlet module is free to transfer cells through any middle module for any virtual circuit. In addition, as seen in FIG. 16 which will be described later, the modest cell storage requirement at the inlet modules eliminates cell loss as a major concern. Thus, the EBR calculation can be based on standard methods applicable to single-stage output buffered or common memory switches. Like the output buffered or common memory switches, the switches of the present invention, with zero guard time, can be treated as non-blocking at the call level. In other words, the admission, or otherwise, of an arrival is determined only by the state of the designated outlet.

With a non-zero guard time, the link capacity is somewhat reduced. It is customary, however, to allow some internal expansion where the inner links are of a slightly higher speed than the outer links. The expansion is provided to facilitate internal flow control and it does not affect the traffic performance of single-stage switches. The expansion has the added benefit of offsetting the guard time overhead.

By definition, a switch is considered non-blocking if the blocking of an incoming request is determined solely by the designated outgoing link. Because of link blocking, the call-level occupancy of an outlet port, i.e., the sum of the EBRs of the calls in progress divided by the port bit rate, fluctuates around its mean value below unity. The outer links would occasionally be in the state of full call level occupancy. To realize an acceptable call blocking (0.01 for example), the outer links may be engineered for a mean call level occupancy of 0.8 or so, depending on the traffic composition. The mean cell level occupancy is lower than the mean call level occupancy since the EBR for a VBR connection is always higher than the mean bit rate of the connection. The simulation results which will be discussed later are based on a pessimistic mean cell level occupancy of 0.80, and the internal expansion is assumed to be zero. With a typical expansion of 0.1 or so, the delay variation would be appreciably smaller.

Cell level performance is normally expressed in terms of the cell loss probability and the cell delay variation. The cross office round trip delay, traditionally specified for circuit switches to be less than one millisecond or so, is still applicable to ATM switches.

The cross office round trip delay for the proposed switch is a constant which is equal to the rotator cycle duration. In a 256 port switch, with a port speed of 10 Gb/s, the rotator cycle is about 175 µsec with a 16 slot access time, or 88 µsec with an access time of 8 slots. The round trip delay is the sum of the delay from inlet port x to outlet port y plus the delay from inlet port y to outlet port x. The two components are not equal, and each varies from one access time $\Delta$ to (N–1) $\Delta$. A long x-y delay corresponds to a short y-x delay, and the sum is constant.

The cell-delay variation is the more critical performance index since it determines the size of the smoothing buffers used for CBR connections. The switch of the invention (with 5 to 10 Gb/s rotator links) yields a delay dispersion, at the $10^{th}$ quantile, well below the commonly accepted bound of 250 µsec at the chosen reference load.

Figure 12:
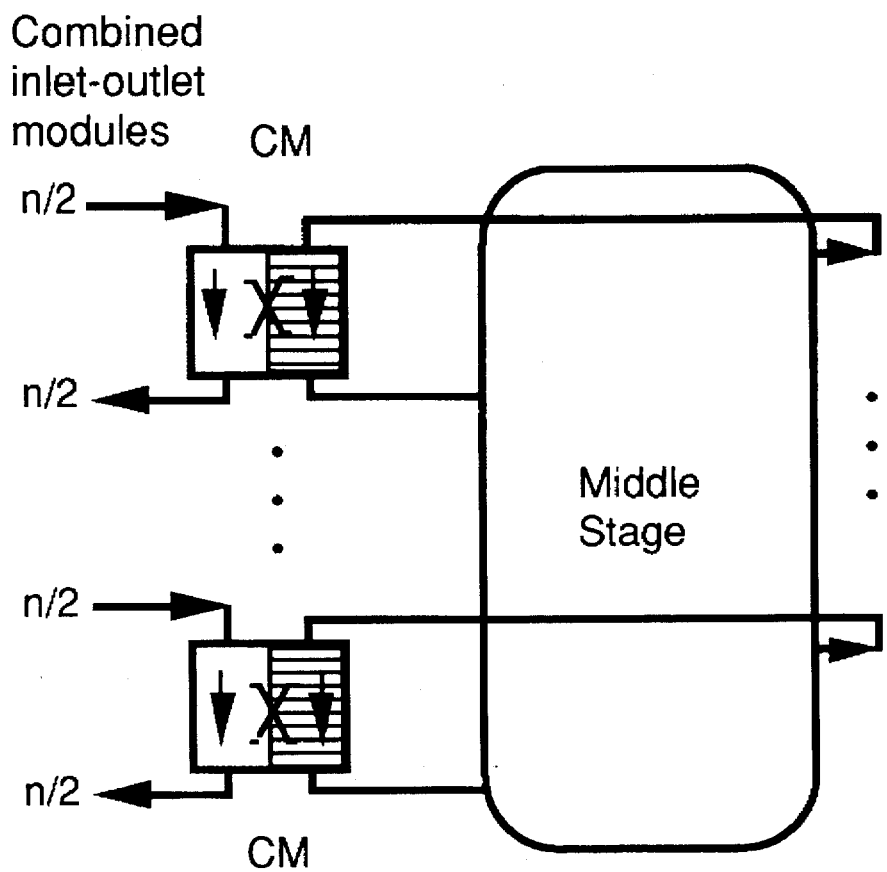
FIG. 12 is a switch system in folded architecture.
Figure 13:
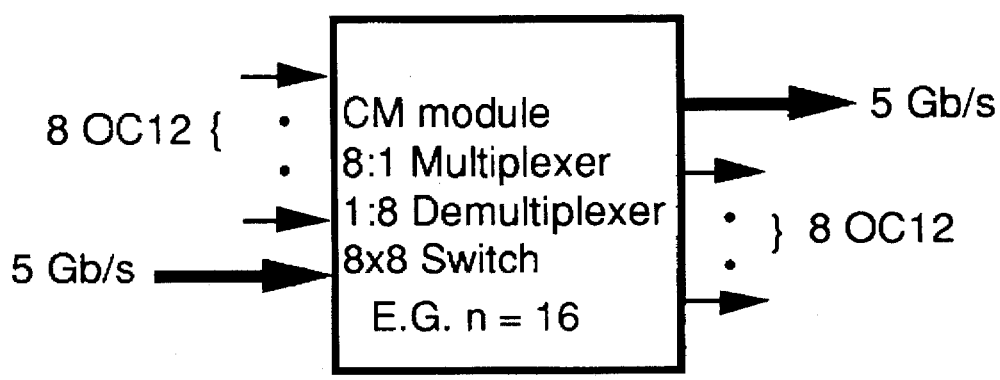
FIG. 13 is a common memory multiplexer/demultiplexer switch.

According to yet a further embodiment, the folded arrangement depicted in FIG. 12 may be used in the configurations of FIGS. 2, 3, 6 and 7. Each CM module serves as a combined multiplexer-demultiplexer-switch as in FIG. 13. An n×n CM module is operated as an n/2:1 multiplexer, a 1:n/2 demultiplexer, and an n/2:n/2 switch (for an even number of external ports n). The effective internal expansion ratio is increased due to the intra-switching facility.

Since the multiplexing function requires very little storage capacity, the common memory capacity of each combined inlet-outlet module is used mainly for egress queuing. A major advantage of this configuration is that only the inter-module traffic would have to traverse the middle stage. This results in reducing the rate of cell transfer across the middle stage and hence decreasing the contention delay.

Figure 14:
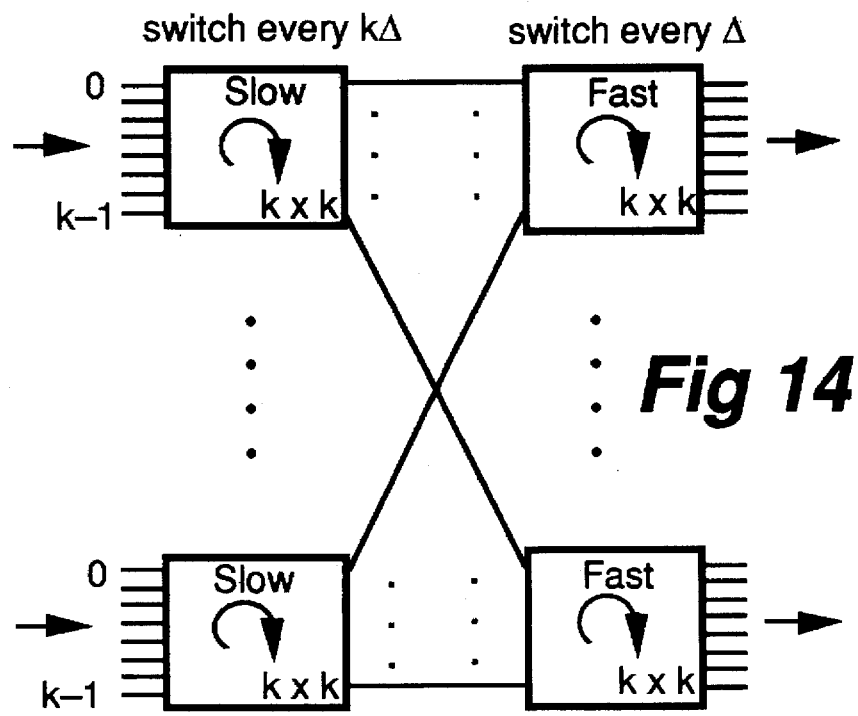
FIG. 14 is a $k^2 \times k^2$ rotator requiring $2k$ units of smaller $k \times k$ rotators.
Figure 15:
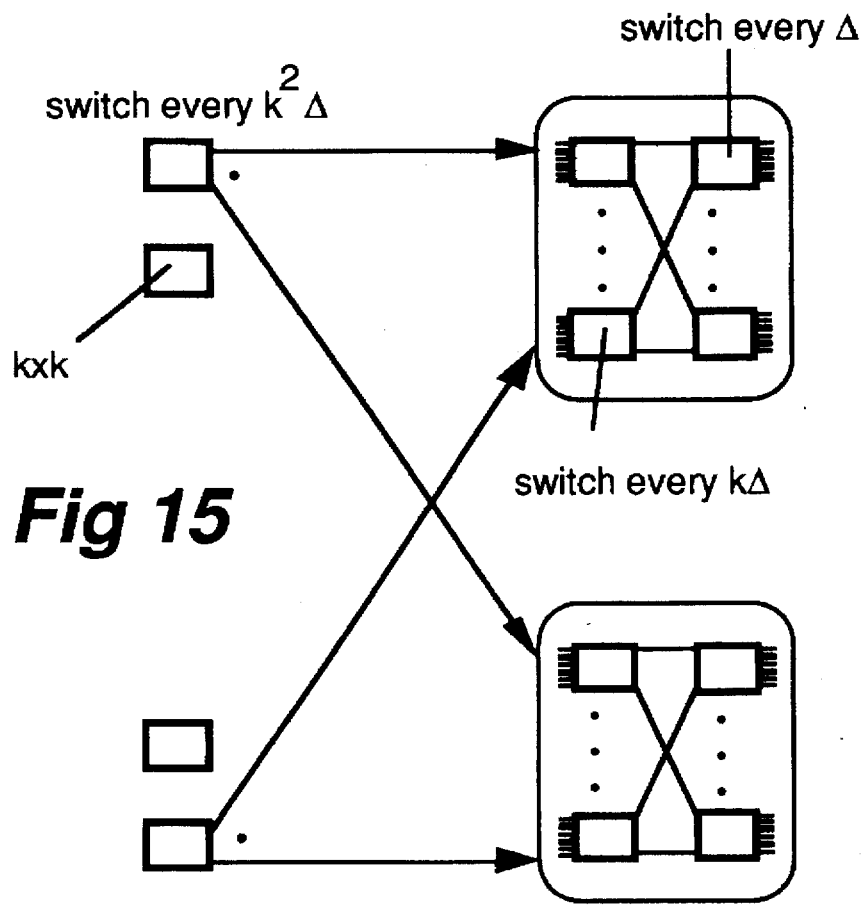
FIG. 15 is a $k^3 \times k^3$ rotator requiring $3k^2$ units of smaller $k \times k$ rotators.

The set of virtual links connecting the outer CMs and the middle CMs is realized as a simple rotator. According to further embodiments of the invention, large rotators may be constructed using smaller size rotator units of size k×k each (k>1) by cascading banks of small units operating at different speeds, that is to say, an $k^h \times k^h$ rotator k=1,2, . . . , can be built by using h rows of $k^{h \times 1}$ smaller rotators of size k×k each. The innermost units must switch ports every Δ slots, where Δ is the desirable access-time. The units of the second bank must switch ports every kΔ slots. FIG. 14 shows a two-stage configuration which extends the capacity to $k^2 \times k^2$. A third bank, whose units switch ports every $k^2\Delta$, extends the capacity to $k^3 \times k^3$ as shown in FIG. 15. For example, a 256×256 rotator requires 32 rotators of size 16×16 arranged in two rows of 16 units each (here k=16 and h=2). In the configuration of FIG. 15, with k=16, a 4096×4096 rotator can be constructed with 768 units (three rows h=3 of 256 units) of 16×16 rotators. It is interesting to note that a non-blocking space switch of the same size would require 65536 units of 16×16 space switches arranged as a square. Unlike the space switch, the rotator's operation is cyclic and traffic independent.

Simulation Results

A simulator for the proposed architecture was developed and used to study the performance of switches of different sizes ranging from N=8 to N=256, with both the folded architecture (with intra-switching in the outer modules) and the unfolded architecture (with no intra-switching). The number of cells processed in each case is about $2.5 \times 10^8$. The inlet module buffer occupancy and the variable cell delay are shown for a port mean cell-occupancy of 0.80.

The traffic arriving at an inlet module port (of OC12 rate, for example) is a multiplex of traffic streams generated by several sources. The traffic generated by each source is assumed to be very bursty, with a large ratio of peak rate to mean rate. Using the ON-OFF model with geometrically distributed "ON" and "OFF" periods, the multiplexed traffic at the inlet module port is assumed to have a mean burst length of 20 (implicitly, the individual sources would have much larger burst lengths at their own peak rates). The composite traffic, at the rotator port rate of 10 Gb/s or so, is much less bursty. As shown in the simulation results below, the dispersion of the delay of cell transfer to the output stage is quite small. The egress process at the output stage (demultiplexing to slower ports) contributes most of the delay and is affected by burstiness in the same way as a single-stage CM switch.

The simulation results were derived for spatially-balanced traffic. Results obtained for several cases with high spatial imbalance (large variance of traffic intensity for different inlet-outlet pairs) show negligible sensitivity to the spatial traffic distribution as long as the overall load for each outlet port remains unchanged.

FIG. 16 shows the inlet buffer distribution for the case of access time Δ of 16 cell intervals (slots) with a guard time γ of 2 cell intervals. For a cell loss of the order of $10^{-7}$, a buffer size of less than 35 cells suffices.

Figure 17:
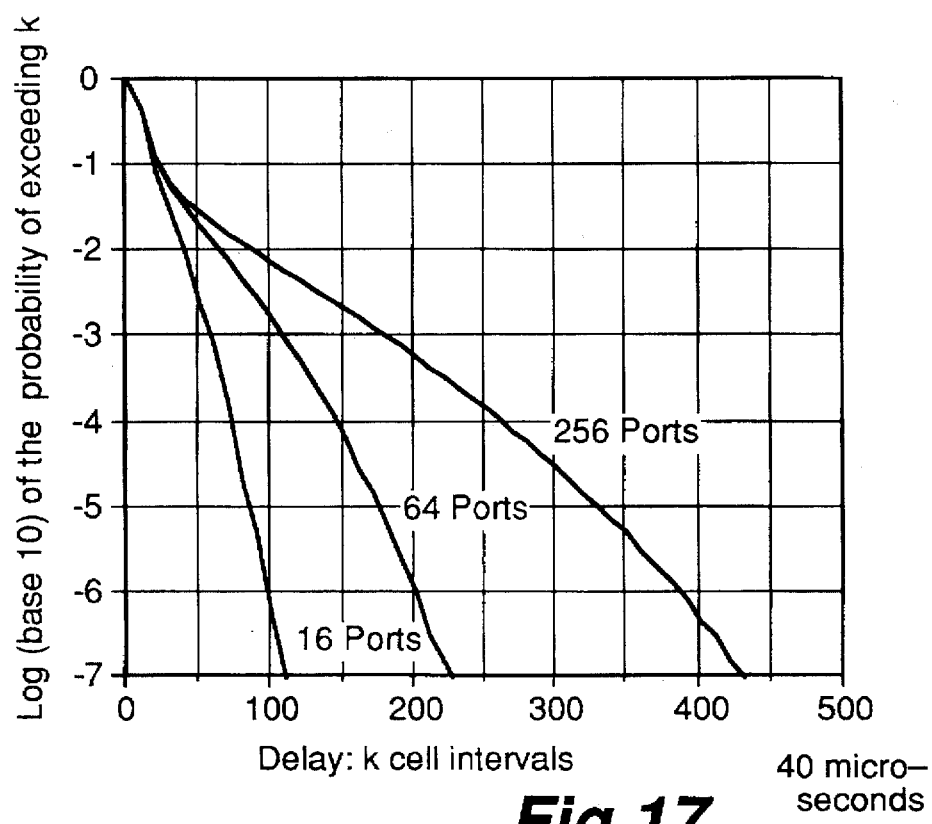
FIGS. 17, 18 and 19 are graphs showing cell-delay complementary functions under different conditions.

FIG. 17 shows the distribution of the variable cell delay (cell delay complementary function) in the folded architecture. The access time Δ is kept constant at 16 cell intervals for the different switch sizes. The guard time is 2 and the cell interval is 0.08 μseconds. The delay increases with the increase of the number of ports due to the increase in the rotator cycle.

Figure 18:
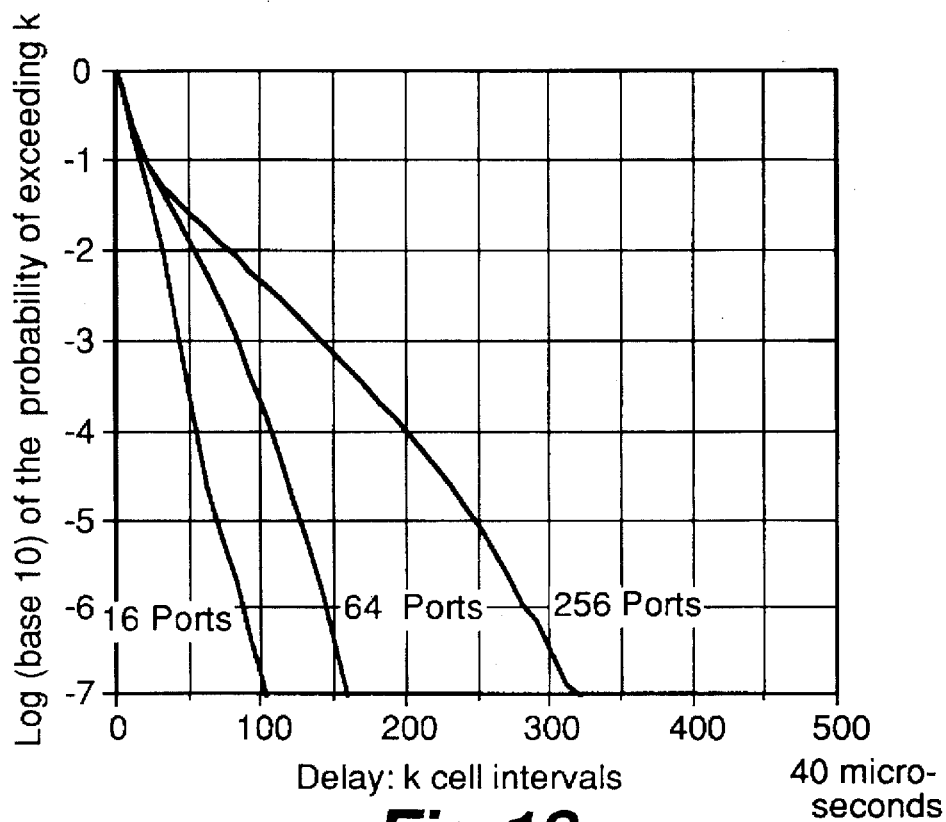

FIG. 18 shows the delay performance (cell delay complementary function) in the folded architecture when the access time Δ is reduced to 8 slots and the guard time is reduced to one slot. The cell interval is 0.08 μseconds. The idle (guard) time remains proportionately the same as in the case of FIG. 17, however, the delay performance improves due to the reduced access time.

Figure 19:
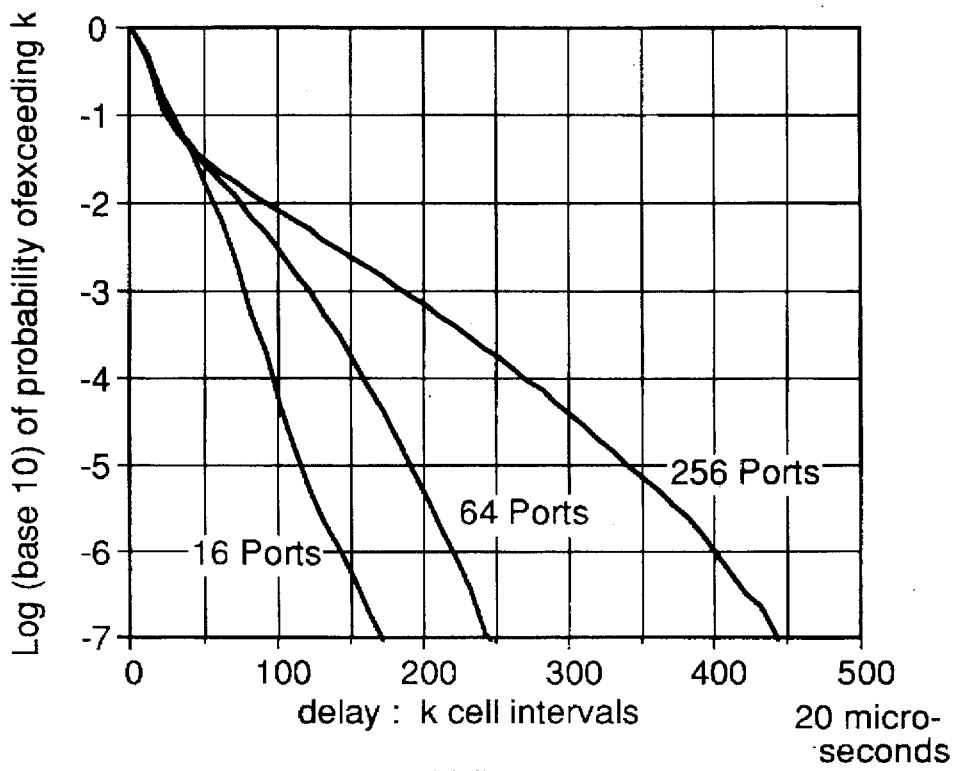

FIG. 19 shows the delay performance (cell delay complementary function) in the case of the unfolded architecture (no intra-module switching). The access time Δ is 16 cells, the guard time is 2 cells and the cell interval is 0.04 μsecond.

What is claimed is:

1. A high capacity ATM switching system for switching data in a heterogeneous burst of a predetermined number of cells among N inlet modules and M outlet modules in each successive access time, M and N being a positive integer or integers, comprising:

said N inlet modules having buffers, each buffer dedicated to each of said outlet modules, for storing cells according to the destination outlet modules of said cells in respective buffers;

P memories, P being a positive integer, each memory having M memory sections, each of which is able to hold at least said predetermined number of cells and is dedicated to each outlet module;

an inlet rotator for cyclically connecting in each access time said N inlet modules and P memories so that respective cells are transferred from said N inlet modules and stored in respective sections according to the destination outlet module of each cell; and an outlet rotator for cyclically connecting in each access time said P memories and M outlet modules so that respective outlet modules are connected to respective memory sections for reading out cells contained therein.

2. The high capacity ATM switching system according to claim 1 wherein the inlet module comprises a buffer which is logically partitioned to buffer sections corresponding to said M output modules.

3. The high capacity ATM switching system according to claim 2 wherein said inlet and outlet rotators are k×k rotators making k simultaneous connections, k being an integer larger than 1.

4. The high capacity ATM switching system according to claim 3 further comprising a matching mechanism for matching cells stored in the buffers of the inlet modules and free slots in the sections of the memories according to the destinations of the predetermined number of cells in a burst.

5. The high capacity ATM switching system according to claim 4 wherein the inlet modules send inlet control data, to the matching mechanism, concerning the number of cells stored in their buffers according to the destinations of the predetermined number of cells; the memories send memory state data, to the matching mechanism, concerning the number of free slots available in the sections; and the matching mechanism sends grant signals to the inlet modules for the number of cells to be transferred according to the destinations of the predetermined number of cells.

6. The high capacity ATM switching system according to claim 4 further comprising:

each inlet module sending inlet control data to one of the memories in every several access times;

a ring controller connecting said P memories in a ring configuration;

each memory having a matching mechanism for sending to each inlet module the grant signals during each access time and updating the inlet control data as a result of the grant signals; and each memory sending the updated inlet control data to the following memory in the ring.

7. The high capacity ATM switching system according to claim 5 wherein M=N=P.

8. The high capacity ATM switching system according to claim 6 wherein M=N=P.

9. The high capacity ATM switching system according to claim 7 wherein each of the input and output rotators comprises h tandemly connected sets of (k×k) rotators where h is a positive integer and $k=\lceil M^{1/h} \rceil$ in that the number of said (k×k) rotators in each set is k and one set operates k times faster than the other set.

10. The high capacity ATM switching system according to claim 8 wherein each of the input and output rotators comprises h tandemly connected sets of (k×k) rotators where h is a positive integer and $k=\lceil M^{1/h} \rceil$ in that the number of said (k×k) rotators in each set is k and one set operates k times faster than the other set.

11. A method of switching data in a heterogeneous burst of a predetermined number of cells among N inlet modules and M outlet modules in each successive access time, M and N being a positive integer or integers, comprising steps of:

each of said N inlet modules storing cells in separate buffers according to the destination outlet modules of said cells;

cyclically connecting said N inlet modules and P memories, P being a positive integer;

transferring in each access time the burst of said predetermined number of cells from one of said N inlet modules to respective memory sections of one of said memories according to the destination outlet modules of said cells; and cyclically connecting said memories and M outlet modules so that respective outlet modules are connected to a respective memory section for reading out cells contained therein.

12. The method of switching data in a burst of a predetermined number of cells according to claim 11, wherein the steps of cyclically connecting comprises steps of:

cyclically making k simultaneous connections in each access time between said inlet modules and said memories, and between said memories and M outlet modules, k being an integer larger than 1.

13. The method of switching data in a burst of a predetermined number of cells according to claim 12 further comprising steps of:

matching cells stored in the buffers of the inlet modules and free slots in the sections of the memories according to the destinations of the predetermined number of cells in a burst.

14. The method of switching data in a burst of a predetermined number of cells according to claim 13, further comprising steps of:

matching inlet control data and memory state data, the former concerning the number of cells stored in their buffers according to the destinations of the predetermined number of cells and the latter concerning the number of free slots available in the sections; and sending grant signals to the inlet modules for a number of cells to be transferred according to the destinations of the predetermined number of cells.

15. The method of switching data in a burst of a predetermined number of cells according to claim 14 wherein said P memories are connected in a ring configuration, the method further comprising steps of:

each inlet module sending inlet control data to one of the memories in every several access times;

each memory matching the inlet control data and memory state data and sending to each inlet module the grant signals during each access time;

each memory further updating the inlet control data as a result of the grant signals; and each memory sending the updated inlet control data to the following memory in the ring.

* * * * *

UNITED STATES PATENT AND TRADEMARK OFFICE
CERTIFICATE OF CORRECTION

PATENT NO.   : 5,745,486
DATED        : April 28, 1998
INVENTOR(S)  : Maged E. Beshai and Ernst A. Munter It is certified that error appears in the above-indentified patent and that said Letters Patent is hereby corrected as shown below:

On the Title page, itme [73] Assignee:
  Change "Montreal, Japan" to --Montreal, CANADA--.

Signed and Sealed this

Seventh Day of July, 1998

*Attest:*

BRUCE LEHMAN

*Attesting Officer*          Commissioner of Patents and Trademarks